United States Patent [19]
Valyi

[11] 3,869,056
[45] Mar. 4, 1975

[54] MULTILAYERED HOLLOW PLASTIC CONTAINER

[76] Inventor: Emery I. Valyi, 5200 Sycamore Ave., Riverdale, N.Y. 10471

[22] Filed: Dec. 26, 1972

[21] Appl. No.: 318,386

Related U.S. Application Data

[63] Continuation-in-part of Ser. Nos. 71,734, Sept. 14, 1970, Pat. No. 3,717,544, and Ser. No. 100,050, Dec. 21, 1971, Pat. No. 3,719,735.

[52] U.S. Cl.............................................. 215/1 C
[51] Int. Cl............................................ B65d 23/08
[58] Field of Search......... 215/1 C, 12 R; 220/63 R; 229/14 R, 14 B

[56] References Cited
UNITED STATES PATENTS

| | | | |
|---|---|---|---|
| 2,710,987 | 6/1955 | Sherman | 264/97 |
| 2,781,551 | 2/1957 | Richerod | 215/1 C X |
| 3,144,167 | 8/1964 | Schultz | 215/1 C UX |
| 3,244,313 | 4/1966 | Miles | 215/1 C X |
| 3,277,220 | 10/1966 | Plymale | 215/1 C UX |
| 3,381,717 | 5/1968 | Tyrrel | 161/139 X |

*Primary Examiner*—Donald F. Norton
*Attorney, Agent, or Firm*—Robert H. Bachman

[57] ABSTRACT

A multilayered hollow plastic container having an inner thermoplastic layer and an outer pressure molded layer, said container having an integral open neck or rim portion, with the thickness of said layers at the neck or rim portion being greater than the thickness of the layers in the remainder of the container, wherein the inner layer overlaps the outer layer at said neck or rim portion.

9 Claims, 8 Drawing Figures

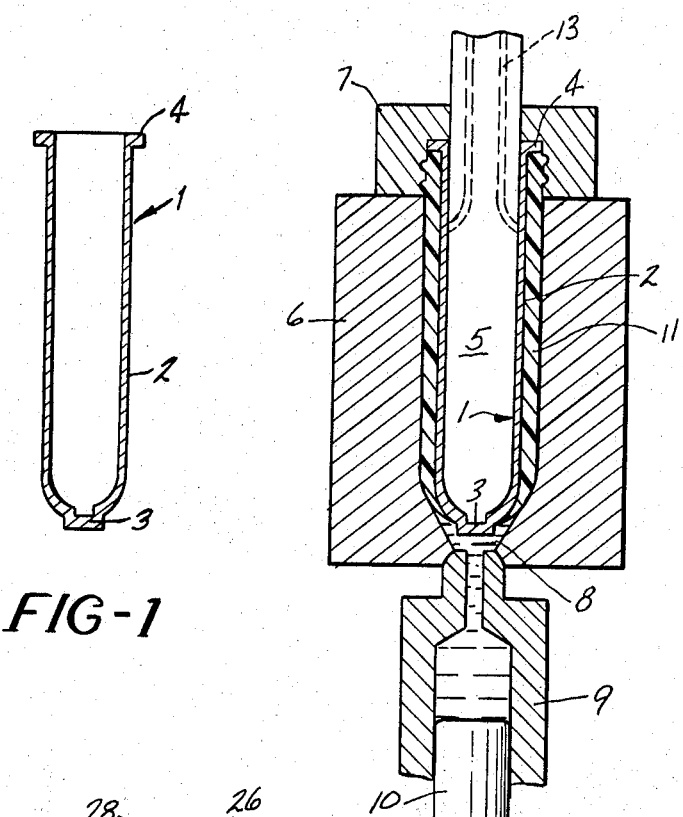
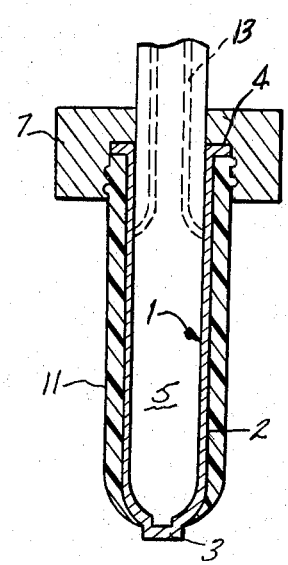
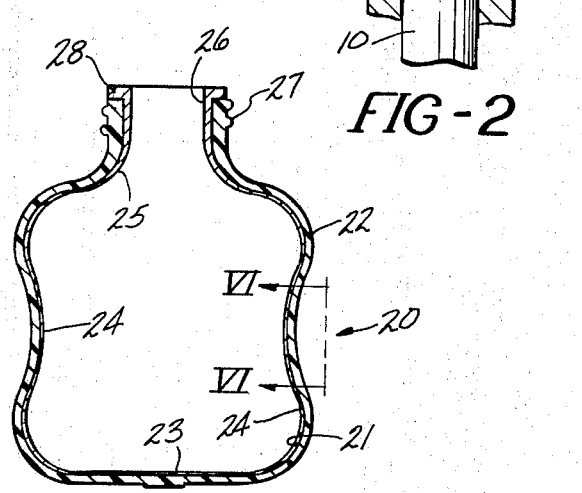
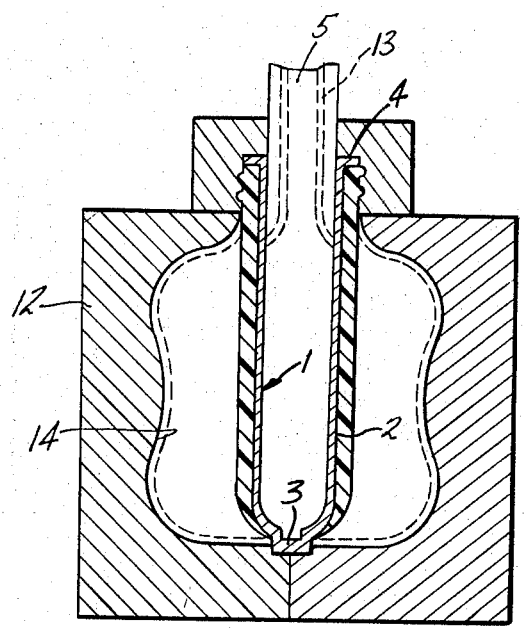
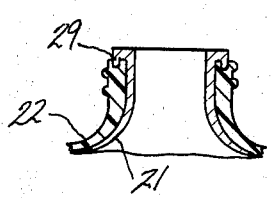
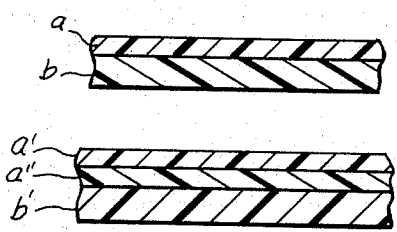
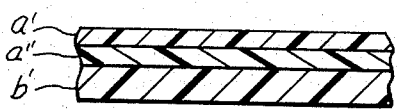

MULTILAYERED HOLLOW PLASTIC CONTAINER

CROSS REFERENCE TO RELATED APPLICATIONS

This application is a continutaion-in-part of copending application Ser. No. 71,734 for "Method and Apparatus for Making Lined Plastic Containers" filed Sept. 14, 1970 by Emery I. Valyi, now U.S. Pat. No. 3,717,544 and copending application Ser. No. 100,050 for "Method for Molding Plastic Containers" filed Dec. 21, 1971 by Emery I. Valyi now U.S. Pat. No. 3,719,735.

BACKGROUND OF THE INVENTION

The invention relates to plastic containers that are provided with a liner of inner layer having different properties than the remainder of the container.

Such lined containers are desirable whenever it is difficult to satisfy all of the requirements and specifications by using a single plastic.

For example, the low cost, easy formability, impact resistance and other desirable properties of polyolefins, or polystyrene, would make them highly desirable containers for many commodities; however, these materials do not have sufficient barrier or solvent resistance for many applications.

In instances of this kind, it has been attempted to provide a lined container, wherein the container wall is composed of more than one substance and thereby provide properties that no single plastic possesses.

However, heretofore the economical production of such containers was prohibitively difficult.

It has been heretofore proposed to produce lined containers by first forming a parison, inserting that parison while in a hot and deformable condition into a previously blown container made of a plastic that is different from the plastic of the parison and expanding said parison into conformance with the container to form an inner liner for the walls of the container.

The difficulties in this procedure are mainly two-fold. The inner liner will tend to shrink away from the outer wall instead of adhering to it and the adhesion will be further impaired by the fact that the contacting surfaces of the liner and the container are too cold at the time of contact to weld together.

It has been proposed to avoid this difficulty by selecting plastics having similar heat expansion properties. While this may provide a solution to the problem of separation of the layers, it limits the choice of available plastics.

Such proposals have the disadvantage of being slow and uneconomical in execution.

My previous U.S. Pat. No. 3,349,155, dated Oct. 24, 1967, discloses an injection blow molding system wherein a parison is formed on a blow core in a parison die. The blow core with the parison thereon is placed into a blow mold wherein the parison is blown into the form of the finished article after which the blow core is retracted to a conditioning station where it is conditioned as by an applied coating before the next injection step, i.e. before being returned to the parison die.

The present invention provides an improvement over the above described procedure wherein coating of the blow core is performed by means of a liner which is preformed and applied to the blow core as a unit while the blow core is in the conditioning station. Such liners may be produced by forming the coating material into a shape which corresponds to the shape of the blow core. The liner element so formed is placed over and into intimate contact with the blow core in the conditioning station and the blow core so coated is inserted into a parison mold, where hot, deformable plastic is injected over the liner. This procedure results in a greatly improved, composite container having characteristics which were not obtained heretofore, the details of which will be seen from the ensuing specification.

Accordingly, it is a principal object of the present invention to provide a multilayered, hollow plastic container.

It is a particular object of the present invention to provide a multilayered, hollow container having many highly desirable characteristics, such as providing in a single container the advantageous characteristics of two separate materials.

It is a further object of the present invention to provide a container as aforesaid which may be conveniently and expeditiously prepared in accordance with the present invention.

Further objects and advantages of the present invention will appear hereinbelow.

SUMMARY OF THE INVENTION

The present invention provides a multilayered hollow plastic container having a base portion, integral side walls and an integral neck or rim portion with an opening therein, which may have a diameter substantially smaller than the diameter of the container, said container having an inner thermoplastic layer, preferably a drawn thermoplastic layer, and an outer pressure molded layer, the two layers being adhered one to the other substantially over their entire contacting areas, the thickness of said layers at the neck or rim portion being substantially greater than the thickness of said layers at the side walls, wherein the inner layer overlaps the outer layer at the neck or rim portion. The neck portion is generally externally equipped to receive a closure, such as being threaded, and preferably the inner layer is embedded in the outer layer at the neck or rim portion. Naturally, if desired, the inner portion may have a plurality of laminations.

The container of the present invention achieves a great many highly desirable advantages. It provides a finished container having the highly desirable properties of the outer layer, for example, polystyrene, polyolefins or polyvinyl chloride, while providing additional advantages that these materials by themselves cannot obtain. Thus, for example, the inner layer may be made to contain an uninterrupted layer of polyvinylidene chloride (PVDC), a plastic having great resistance to oxygen or carbon dioxide. To facilitate the handling of PVDC in the process of the present invention, it is useful to laminate this material between two layers of plastics that are more convenient to handle, such as polystyrene or polyethylene.

In addition, the thickened neck or rim portion provides reinforcement where strength is needed, expecially in an externally threaded container which is subjected to repeated use. The overlapping of the outer layer by the inner layer, and preferably embedding the inner layer in the outer layer, tends to prevent separation of the layers at the exposed neck opening where the container is frequently handled. Further, the container generally has a relatively thicker base portion than the side walls, which adds reinforcement at this needed location.

BRIEF DESCRIPTION OF DRAWINGS

The present invention will be more readily understood from a consideration of the accompanying drawings in which:

FIG. 1 is a longitudinal section of a sleeve adapted to surround a blow core;

FIG. 2 is a longitudinal section with parts in elevation of a parison mold showing the blow core covered by a sleeve;

FIG. 3 is a similar view showing the blow core retracted from the parison mold with the parison thereon;

FIG. 4 is a similar view showing the blow core in blow position within the blow mold and the hollow container of the present invention in the blow mold cavity;

FIG. 5 shows the hollow container of the present invention removed from the blow mold;

FIG. 6 is an exaggerated section taken on line VI — VI of FIG. 5 showing a laminated web;

FIG. 7 is an alternate embodiment similar to FIG. 6 showing a three layered laminated web; and FIG. 8 shows the web portion of the container of the present invention showing the inner layer embedded in the outer layer.

DETAILED DESCRIPTION

Referring to the drawings more in detail, FIG. 1 shows a sleeve 1 for the blow core to be used in the subsequent molding operation, having an inner surface closely approximating the outer surface of that blow core. The thickness of the sleeve may vary; thus, its side walls 2 may be very thin, such as between 0.001 inch and 0.020 inch, while its bottom 3 may be twice to ten times as thick as the side walls and have a shape adapted to provide alignment with the parison mold. The rim 4 of the sleeve may conform to the top region of the hollow article to be made. Such sleeves may be produced from a variety of plastics at reasonable cost, by methods well known in the art, such as for example by thermoforming, injection molding, blow molding, powder coating, casting; these methods being described on pages 534, 594, and 6.2, respectively, of the 1969–1970 Modern Plastics Encyclopedia, published by McGraw-Hill, Inc.; and by other methods well known in the art of manufacturing thin-walled, shaped containers of plastic.

The sleeves shown in FIG. 1 are used in a parison mold according to FIG. 2 which consists of blow core 5 and a parison mold 6 and a tool for the forming of the open end of the hollow article, the neck ring 7. A passage 8 connects the parison mold 6 with a supply of hot plastic contained within cylinder 9 from which the molten plastic may be pressed into parison mold 6 by piston 10 under sufficient pressure to effect rapid filling of the space between the blow core 5 and parison mold 6 and the space within neck ring 7 communicating with the parison mold.

The parison 11 molded in the apparatus shown in FIG. 2 may be removed from the parison mold 6 together with the blow core 5 and the neck ring 7, as shown in FIG. 3 and inserted into a blow mold 12. Pressure fluid obtained from a source not shown may be admitted through fluid passages 13 to the interior of parison 11. The blow mold 12 has a mold cavity 14 corresponding to the shape of the hollow container to be made and it may be made of two halves which are separable to facilitate the removal of the finished article to be made therein.

The above indicated movements of the blow core may for example be carried out by apparatus shown in U.S. Pat. Nos. 2,298,716; 3,100,913; 3,183,551; and in my U.S. Pat. No. 3,029,468. In any such apparatus, one or more blow cores may be used simultaneously and they may be moved from one operating position to another individually or in groups of several blow cores.

In operation of this method, sleeves according to FIG. 1 may be produced by any of the procedures referred to before, independently of the injection blow molding operation here described. Alternately, sleeves may also be fashioned in place, as for example indicated in my U.S. Pat. No. 3,349,155 or by wrapping plastic film stock tightly around the blow core 5. The sleeve material must have deformation characteristics that equal or exceed those of the parison material, at the temperature normally maintained for expanding the parison into the blow mold cavity 14.

The material of the sleeves has to be compatible with the material of the parison 11 and not interfere with the function of the hollow article to be made from the parison. Accordingly, the material of the sleeve should be capable of adhering to the material of the parison at the temperature normally used for injection molding the latter material, such as by fusing thereinto or by alloying therewith. To facilitate such bonding, the outside surface of the sleeve 1 that is to come into contact with the injected plastic of the parison 11 may be treated by procedures that are known in the art to promote the adhesion of plastic surfaces. For example, if the sleeve is to be made of polyethylene, its outside surface may be flame treated.

Sleeve 1 need not be made of a single material. For example, the sleeve side walls 2 may be made of a material that is different from the material in the sleeve bottom 3 which may, at times, be provided with a reinforcement for better support of the parison.

The sleeve 1 which fits snugly over the blow core 5 is placed thereover by hand, or by mechanical means, not shown, before the blow core is inserted into the parison mold 6. When in place within the parison mold, the tip of the blow core, surrounded by the bottom 3 of the sleeve may be held firmly against the inner wall of the parison mold, whenever it is desired to stabilize the blow core.

After the blow core is in place, hot plastic is injected into the parison mold through orifice 8 under action of piston 10 operating in pressure cylinder 9. After injection, the hot plastic surrounds the sleeve 1 under pressure. Due to the intimate contact established thereby between the hot plastic and the exposed surface of the sleeve, the sleeve is rapidly heated until its temperature approaches that of the injected plastic. At that temperature, adhesion of the two materials occurs readily and the material of the sleeve is moreover heated throughout sufficiently to render the sleeve deformable at the same rate as the injected plastic. Accordingly, the sleeve unites with the injected plastic and combines with it to form the composite parison 11.

After forming of the parison by injection and the joining of the sleeve to the injected plastic, the blow core 5 is removed from the parison mold together with the neck ring 7 and with the parison 11 thereon, as shown in FIG. 3. It is next inserted into the blow mold 12, shown in FIG. 4.

For accurate location of the blow core 5 in the blow mold 12, the blow core may be pressed against the bottom of the blow mold, with the sleeve bottom 3 therebetween. Thus, the blow core is maintained in alignment in the blow mold, the same as it was in the parison mold. As the next step, pressure fluid, usually compressed air, is admitted into the parison through fluid passages 13 and the parison is expanded into the blow mold 12, to assume the shape of the blow mold cavity 14, as indicated by dotted lines in FIG. 4. Fluid pressure is maintained until the blown article cools sufficiently in contact with the walls of the blow mold 12, to be removed therefrom.

Thus, the hollow multilayered container of the present invention is shown in FIG. 5, generally indicated at 20, removed from the blow mold, having an inner layer 21 and an outer layer 22, both as described above. It can be clearly seen that the container has a base portion 23, integral side walls 24 and an integral neck or rim portion 25 having a constricted neck opening 26, with the laminated plastic being relatively thicker at the neck portion than at the side walls. If desired, the neck portion may be relatively thicker than at the base portion, although strengthening at the base portion may be desirable. It can be clearly seen that the diameter of the opening 26 in the neck portion may be substantially smaller than the diameter of the container and also the thickness of the layers of plastic is substantially greater at the neck portion than the thickness of the layers of plastic at the side walls. This provides the necessary strengthening at the neck or rim opening, especially in view of the fact that the neck opening is often externally threaded as shown at 27.

A significant characteristic of the container of the present invention is the feature that the inner layer 21 overlaps the outer layer 22 at the neck portion, as shown at 28. This feature tends to prevent the inner layer from pulling away from the outer layer at the exposed neck or rim portion and it provides a sealing layer at the top of the container that has the characteristics of the inner layer.

FIG. 8 shows a preferred embodiment where the inner layer 21 is embedded in the outer layer 22 to provide even greater security. This feature can be readily provided by simply modifying the shape of the parison shown in FIG. 1.

It is preferred to provide that the base portion 23 have a thickness greater than the thickness of the side walls 24 since greater strength is frequently required at the base portion. Further, a particular advantage of the container of the present invention is that the side walls have a substantially uniform wall thickness, both with respect to the inner and outer layers, to avoid localized discontinuities or weak spots.

As indicated hereinabove, the composite container of the present invention may comprise two layers, as shown in FIG. 6 where *a* represents the inner layer and *b* represents the outer layer. Alternatively, three or more layers may be provided as shown in FIG. 7 where the inner layer is a laminate of two materials *a'* and *a"*, with *b'* representing the outer layer. Normally the inner layer is substantially thinner than the outer layer since the inner layer is frequently the more expensive component.

A wide flexibility may be used in selecting the inner and outer layers depending upon the particular property desired in each layer. Thus, for example, the inner layer may be selected to provide a wide variety of highly desirable properties, such as solvent resistance and resistance to gas transmission. Examples of liners include acetal polymers, polyallomer copolymers, polycarbonates, PVDC, polyvinylchloride, acrylonitrile and methacrylonitrile polymers, nylon and others. Alternatively, the liner may be a laminated film containing polyethylene, polypropylene, PVDC, polyvinyl chloride, etc.

Similarly, the outer layer may be selected depending upon the particular properties desire. For example, one may readily utilize polyolefins, such as polyethylene or polypropylene or copolymers thereof, polystyrene, polycarbonates, polyvinyl chloride and others.

As can be readily seen, the container of the present invention provides the considerable advantages of polyolefins, such as reasonable cost, ease of formability, impact resistance, capability of being strengthened by orientation, and others, plus the desirable characteristics of the chosen inner film.

Alternatively, the two materials may be made to differ as to their radiation transmission properties, such as, for example, ultraviolet radiation and the corresponding inspection effected by known means to detect the respective radiation intensity.

It is also possible to produce finished articles having desirable appearance by providing different colors and degrees of transparency in the sleeve and in the material that is injected around it.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A multilayered hollow plastic container having a base portion, integral side walls and an integral open neck or rim portion, said container exhibiting the characteristics of blow orientation and having an inner drawn seamless thermoplastic layer and an outer solid seamless pressure molded layer, the two layers being adhered one to the other substantially over their entire contacting areas, the thickness of said layers at the neck or rim portion being greater than the thickness of said layers at the side walls, wherein the inner layer overlaps the outer layer at said neck or rim portion.

2. A container according to claim 1 wherein said neck portion is externally threaded.

3. A container according to claim 2 wherein said inner layer is embedded in said outer layer at the neck or rim portion.

4. A container according to claim 2 wherein the thickness of said layers at the base portion is greater than the thickness of said layers at the side walls.

5. A container according to claim 2 wherein said side walls have a substantially uniform wall thickness.

6. A container according to claim 2 wherein said inner layer is thinner than said outer layer.

7. A container according to claim 1 wherein said inner layer is composed of drawn plastic sheet.

8. A container according to claim 1 wherein said inner layer is composed of a plurality of laminations.

9. A container according to claim 1 wherein said open portion has a diameter smaller than the diameter of the container.

* * * * *